(12) United States Patent
King et al.

(10) Patent No.: US 12,071,119 B2
(45) Date of Patent: Aug. 27, 2024

(54) EMERGENCY VEHICLE BRAKING USING CLOSED-LOOP PULSING

(71) Applicant: Textron Innovations Inc., Providence, RI (US)

(72) Inventors: Russell William King, Evans, GA (US); Kevin Douglas Grove, McCormick, SC (US)

(73) Assignee: Textron Innovations Inc., Providence, RI (US)

( * ) Notice: Subject to any disclaimer, the term of this patent is extended or adjusted under 35 U.S.C. 154(b) by 537 days.

(21) Appl. No.: 17/183,779

(22) Filed: Feb. 24, 2021

(65) Prior Publication Data

US 2022/0266806 A1 Aug. 25, 2022

(51) Int. Cl.
| | |
|---|---|
| *B60L 50/60* | (2019.01) |
| *B60T 8/171* | (2006.01) |
| *B60T 8/172* | (2006.01) |
| *B60T 8/96* | (2006.01) |
| *B60T 13/74* | (2006.01) |
| *B60T 17/22* | (2006.01) |
| *F16D 121/22* | (2012.01) |

(52) U.S. Cl.
CPC .............. *B60T 8/96* (2013.01); *B60L 50/60* (2019.02); *B60T 8/171* (2013.01); *B60T 8/172* (2013.01); *B60T 13/743* (2013.01); *B60T 17/221* (2013.01); *B60L 2240/12* (2013.01); *B60T 2250/04* (2013.01); *F16D 2121/22* (2013.01)

(58) Field of Classification Search
CPC ........ B60L 50/60; B60L 2240/12; B60T 8/96; B60T 8/171; B60T 8/172; B60T 13/743; B60T 17/221; B60T 2250/04; F16D 2121/22
See application file for complete search history.

(56) References Cited

U.S. PATENT DOCUMENTS

| | | | |
|---|---|---|---|
| 5,417,193 | A | 5/1995 | Fillman et al. |
| 5,642,023 | A | 6/1997 | Journey |
| 5,793,175 | A | 8/1998 | Journey |
| 5,814,958 | A | 9/1998 | Journey |
| 7,332,881 | B2 | 2/2008 | Clark et al. |
| 7,560,882 | B2 | 7/2009 | Clark et al. |
| 7,825,616 | B2 | 11/2010 | Clark et al. |
| 8,120,291 | B2 | 2/2012 | Clark et al. |
| 8,395,529 | B2 | 3/2013 | Seder et al. |

(Continued)

*Primary Examiner* — Adam D Tissot
*Assistant Examiner* — Torrence S Marunda, II
(74) *Attorney, Agent, or Firm* — BainwoodHuang

(57) ABSTRACT

A technique controls an electric brake of a vehicle. The technique involves continuously providing power to the electric brake of the vehicle to continuously disengage the electric brake and allow the vehicle to move. The technique further involves, while power is continuously provided to the electric brake and the vehicle is moving, sensing a fault condition. The technique further involves, in response to sensing the fault condition, providing electric pulses to the electric brake in place of continuously providing power to the electric brake, the electric pulses having varying pulse timing that controls braking of the vehicle. Accordingly, the vehicle is able to provide a more consistent braking response regardless of variations in certain factors such as brake calibration and/or current wear, the current weight in the vehicle, the current temperature, etc.

17 Claims, 8 Drawing Sheets

(56) References Cited

U.S. PATENT DOCUMENTS

| | | | |
|---|---|---|---|
| 9,847,741 B2* | 12/2017 | Schoenlinner | H02P 3/04 |
| 10,001,183 B2* | 6/2018 | Nishino | F16D 55/225 |
| 10,017,169 B1 | 7/2018 | Harvey et al. | |
| 10,195,948 B2 | 2/2019 | O'Hara et al. | |
| 10,195,953 B2 | 2/2019 | Harvey et al. | |
| 10,300,895 B2* | 5/2019 | Kobune | B60T 13/741 |
| 10,322,688 B2 | 6/2019 | Harvey et al. | |
| 10,471,831 B2 | 11/2019 | Harvey et al. | |
| 10,723,227 B2* | 7/2020 | Lian | B60L 15/2009 |
| 10,933,755 B2 | 3/2021 | Harvey et al. | |
| 11,021,068 B2* | 6/2021 | Shindo | B60W 10/188 |
| 11,108,249 B2 | 8/2021 | King et al. | |
| 11,124,074 B2 | 9/2021 | Harvey et al. | |
| 11,325,482 B2 | 5/2022 | Harvey et al. | |
| 11,433,867 B2* | 9/2022 | Yi | B60T 13/748 |
| 2018/0215404 A1* | 8/2018 | Hayashi | B62B 5/004 |
| 2021/0221341 A1* | 7/2021 | Galizzi | B60T 13/74 |

* cited by examiner

EMERGENCY VEHICLE BRAKING USING CLOSED-LOOP PULSING

BACKGROUND

Some conventional electric vehicles include electric parking brakes that are spring biased to applying brakes. When there is no power provided to the electric parking brake of such an electric vehicle (e.g., when the electric vehicle is turned off), the electric parking brake engages thus holding the electric vehicle safely in place (i.e., "in park"). When power is provided to the electric parking brake, the electric parking brake releases thus enabling the electric vehicle to be driven.

If the electronic controller of such an electric vehicle detects an unsafe situation while the electric vehicle provides power to the electric parking brake, the electronic controller may turn off power to the electric parking brake. In such a situation, the electric parking brake engages to hold the electric vehicle safely in place.

SUMMARY

It should be understood that there may be deficiencies to the above-described conventional electric vehicle having an electronic controller that simply turns the power off to the electric parking brake. For example, suppose that the electric vehicle is equipped with regenerative braking as its primary brakes and simply uses the electric parking brake for parking and in emergency situations. Further suppose that the electric vehicle detects a failure of regenerative braking and that the electronic controller considers this to be an unsafe situation. If the electronic controller turns off power to the electric parking brake, the electric parking brake will immediately engage and the electric vehicle may stop abruptly perhaps causing passenger dissatisfaction.

To prevent the conventional electric vehicle from stopping so abruptly, the electronic controller may be configured to respond to the fault condition by repetitively cutting the power to the electric parking brake for a set time (e.g., a few hundred milliseconds) to engage the brakes and then providing power to the electric parking brake for a set time (e.g., a few hundred milliseconds) to release the brakes. In response, the electric parking brake engages intermittently and may provide more gradual braking thus slowing the vehicle less abruptly.

Unfortunately, there may be inconsistencies in the effectiveness of the above-described open-loop approach to oscillating power to the electric parking brake. In particular, the braking response from electric parking brakes is a function of a variety of factors such as variation from brake to brake (e.g., age of certain brake components, calibration differences, etc.), the weight currently carried by the electric vehicle, the current temperature, and so on. Accordingly, simply configuring the electronic controller on each electric vehicle to oscillate power to the electric parking brake for set times may provide mixed results across electric vehicles. In particular, simply oscillating electric parking brake power using such an open-loop approach may cause some electric vehicles to still stop abruptly and other electric vehicles to provide ineffective braking.

In contrast, improved techniques are directed to controlling an electric brake of a vehicle by providing electric pulses having varying pulse timing, e.g., dynamically generating step signals to control the electric brake, based on a velocity feedback signal. Such techniques provide closed-loop control of electric brake "ON" and/or "OFF" pulse timing to counter any variation in electric brake response. Accordingly, each vehicle may be configured to provide a more consistent braking response regardless of variations from brake to brake, the current weight carried by the vehicle, environmental conditions, and so on.

One embodiment is directed to a method of controlling an electric brake of a vehicle. The method includes continuously providing power to the electric brake of the vehicle to continuously disengage the electric brake and allow the vehicle to move. The method further includes, while power is continuously provided to the electric brake and the vehicle is moving, sensing a fault condition. The method further includes, in response to sensing the fault condition, providing electric pulses to the electric brake in place of continuously providing power to the electric brake, the electric pulses having varying pulse timing that controls braking of the vehicle.

Another embodiment is directed to electronic circuitry to control an electric brake of a vehicle. The electronic circuitry includes an electric brake interface, a sensor interface, and control circuitry coupled to the electric brake interface and the sensor interface. The control circuitry is constructed and arranged to perform a method of:
(A) continuously providing power to the electric brake of the vehicle through the electric brake interface to continuously disengage the electric brake and allow the vehicle to move,
(B) while power is continuously provided to the electric brake and the vehicle is moving, sensing a fault condition via the sensor interface, and
(C) in response to sensing the fault condition, providing electric pulses to the electric brake through the electric brake interface in place of continuously providing power to the electric brake, the electric pulses having varying pulse timing that controls braking of the vehicle.

Yet another embodiment is directed to an electric vehicle which includes a vehicle body, an electric brake supported by the vehicle body, and electronic circuitry coupled to the electric brake. The electronic circuitry is constructed and arranged to perform a method of:
(A) continuously providing power to the electric brake to continuously disengage the electric brake and allow the electric vehicle to move,
(B) while power is continuously provided to the electric brake and the electric vehicle is moving, sensing a fault condition, and
(C) in response to sensing the fault condition, providing electric pulses to the electric brake in place of continuously providing power to the electric brake, the electric pulses having varying pulse timing that controls braking of the electric vehicle.

In some arrangements, the electric brake includes (i) a set of springs that configured to bias the electric brake into an engaged state that provides braking resistance to the electric vehicle, and (ii) a set of electromagnets configured to urge (or move) the electric brake from the engaged state to a released state that removes the braking resistance.

In some arrangements, the electric vehicle further includes a lithium battery supported by the vehicle body. Additionally, continuously providing power to the electric brake includes outputting a steady power signal from the lithium battery to the set of electromagnets to urge the electric brake from the engaged state to the released state.

Furthermore, providing the electric pulses includes intermittently cutting power from the lithium battery to the set of electromagnets to enable the electric brake to intermittently transition from the released state back to the engaged state.

In some arrangements, the method includes receiving a velocity feedback signal indicating current vehicle velocity. Additionally, providing the electric pulses includes dynamically generating, as a control signal that controls the electric pulses, a series of step signals based on the velocity feedback signal.

In some arrangements, dynamically generating the series of step signals based on the velocity feedback signal includes, based on a first vehicle velocity indicated by the velocity feedback signal, outputting a first step signal having a first "ON" time for engaging the electric brake and a first "OFF" time for disengaging the electric brake, and based on a second vehicle velocity indicated by the velocity feedback signal, outputting a second step signal having a second "ON" time for engaging the electric brake and a second "OFF" time for disengaging the electric brake. At least one of (i) the first "ON" time is different from the second "ON" time, or (ii) the first "OFF" time is different from the second "OFF" time.

In some arrangements, the first vehicle velocity is faster than the second vehicle velocity. Additionally, the first "ON" time is longer than the second "ON" time.

In some arrangements, the first vehicle velocity is faster than the second vehicle velocity. Additionally, the first "OFF" time is longer than the second "OFF" time.

In some arrangements, the first "ON" time is different from the second "ON" time. Additionally, the first "OFF" time is different from the second "OFF" time.

In some arrangements, the electric brake includes (i) a set of springs that configured to bias the electric brake into an engaged state that provides braking resistance to the vehicle, and (ii) a set of electromagnets configured to urge the electric brake from the engaged state to a released state that removes the braking resistance. Additionally, continuously providing power to the electric brake includes outputting a steady power signal from a power source to the set of electromagnets to urge the electric brake from the engaged state to the released state.

In some arrangements, providing the braking pulses includes intermittently cutting power from the power source to the set of electromagnets to enable the electric brake to intermittently transition from the released state back to the engaged state.

In some arrangements, sensing the fault condition includes comparing a set of current vehicle readings to a set of expected vehicle criteria, and detecting that at least one current vehicle reading of set of current vehicle readings is out of compliance with at least one expected vehicle criterion of the set of expected vehicle criteria.

In some arrangements, detecting includes determining that a current rotations per minute (RPM) reading from an electric motor of the vehicle exceeds a predefined RPM threshold to indicate that the fault condition has occurred.

In some arrangements, the method further includes:
(i) in response to sensing the fault condition, starting a timer, and
(ii) in response to the timer identifying that a predefined amount of time has elapsed since sensing the fault condition, discontinuing the braking pulses to the electric brake to continuously engage the electric brake.

In some arrangements, the method further includes, in response to sensing the fault condition, activating an audio alarm to indicate imminent deceleration of the vehicle. Accordingly, passengers are able to brace for controlled deceleration of the vehicle.

Other embodiments are directed to higher and lower level systems, assemblies, apparatus, processing circuits, computer program products, etc. Some embodiments are directed to various processes, electronic components and circuitry, mechanical devices, and other componentry which are involved in providing emergency vehicle braking using closed-loop pulsing.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to controlling an electric brake of a vehicle by providing electric pulses having varying pulse timing, e.g., dynamically generating step signals to control the electric brake, based on a velocity feedback signal. Such a technique provides closed-loop control of braking "ON" and/or "OFF" pulse timing to counter any variation in electric brake response from one vehicle to another. Accordingly, each vehicle may be reliably configured to provide a consistent emergency braking response regardless of variations from brake to brake, the current weight carried by that vehicle, environmental conditions, and so on.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
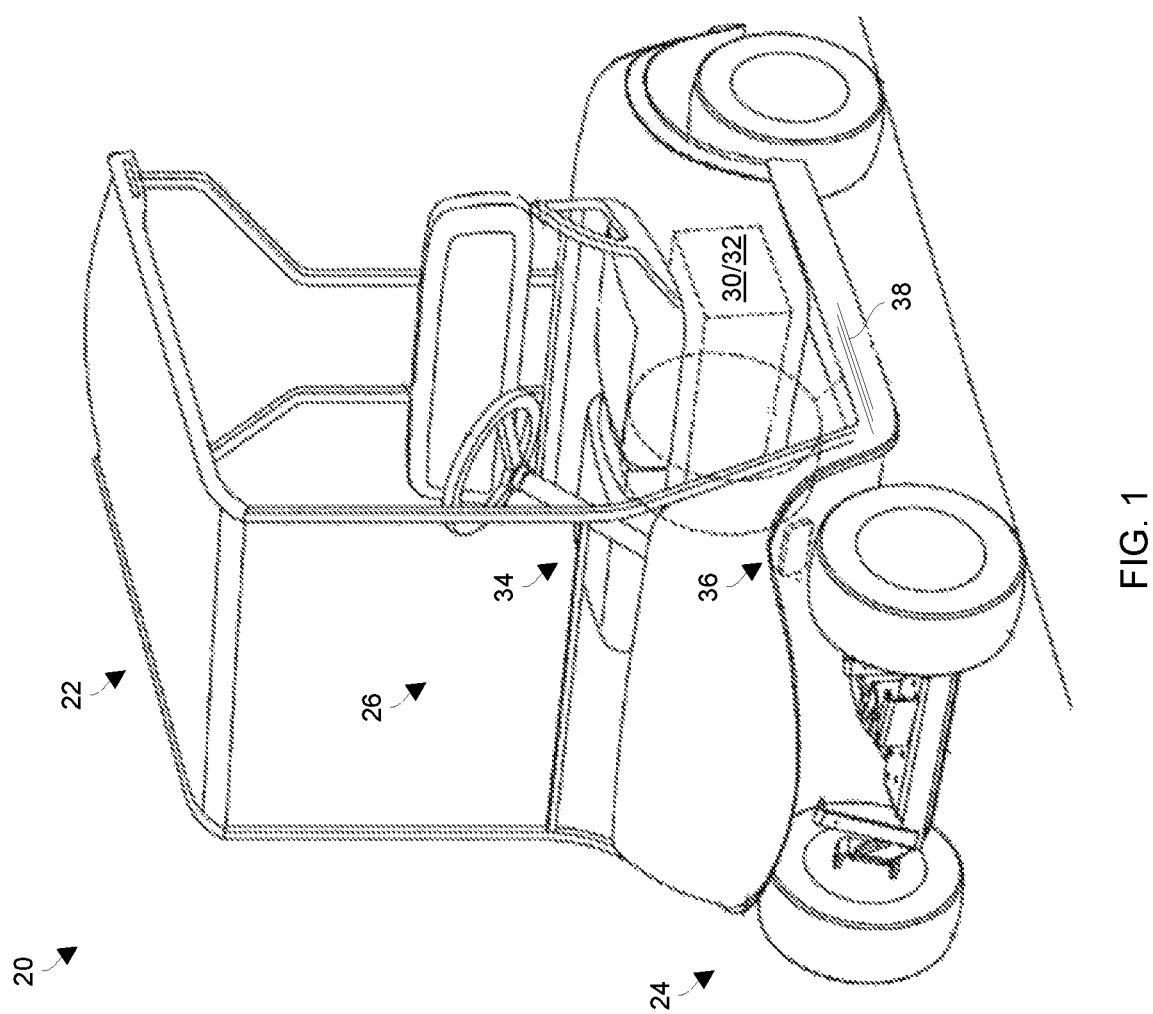
FIG. 1 is a perspective view of an example utility vehicle which provides emergency vehicle braking using closed-loop pulsing.

FIG. 1 shows an example utility vehicle 20 which provides emergency vehicle braking using closed-loop pulsing. The utility vehicle 20 includes a utility vehicle body 22 (e.g., a chassis, a frame, etc.), a set of tires (or wheels) 24, and a motion control system 26. It should be understood that the utility vehicle 20 has the form factor of a golf car by way of example only and that other utility vehicle form factors are suitable for use as well such as those of personal transport vehicles, food and beverage vehicles, hospitality vehicles, all-terrain vehicles (ATVs), utility task vehicles (UTVs), motorcycles, scooters, vehicles for specialized applications, as well as other lightweight vehicles and utility vehicles.

The motion control system 26 controls vehicle movement such as drive provided by the set of tires 24, speed control, braking, and so on thus enabling the utility vehicle 20 to perform useful work. The motion control system 26 of the illustrated embodiments includes, among other things, a motor system 30, a rechargeable battery system 32, and additional components 34 such as a set of user controls 36 (e.g., foot pedals, a keyed switch, a maintenance switch, etc.) and cabling 38.

It should be understood that certain components of the motor control system 26 (or portions thereof) may be disposed within a set of compartments (in one or more compartments) under a set of seats (under one or more seats) of the utility vehicle 20. For example, a compartment underneath a seat of the utility vehicle 20 may house one or more rechargeable batteries, control circuitry, cabling, controls, etc. for ease of access/serviceability, for protection against damage, for security, and so on.

It should be further understood that the motion control system 26 includes other apparatus/components as well. Along these lines, the motion control system 26 further includes a drivetrain (e.g., a set of gears, linkage, etc.) that connects the motor system 30 to the set of tires 24 (e.g., two drive wheels and two non-drive wheels), a steering wheel (or column), a steering gear set that connects the steering wheel to certain tires 24, a set of brakes, other controls and sensors, and so on.

As will be explained in further detail shortly, the utility vehicle 20 includes an electric parking brake which disengages only when energized. In response to an emergency situation (e.g., loss of regenerative braking, a detected overspeed condition in which the current speed of the utility vehicle 20 exceeds a predefined maximum speed, etc.), the utility vehicle 20 may cut power to the electric parking brake. However, to prevent the utility vehicle 20 from stopping too abruptly, the utility vehicle 20 provides closed-loop control of pulse timing to counter any variation in electric brake response. Accordingly, the utility vehicle 20 is able to slow more gradually before cutting power to the electric parking brake for good. Further details will now be provided with reference to FIGS. 2 and 3.

Figure 2:
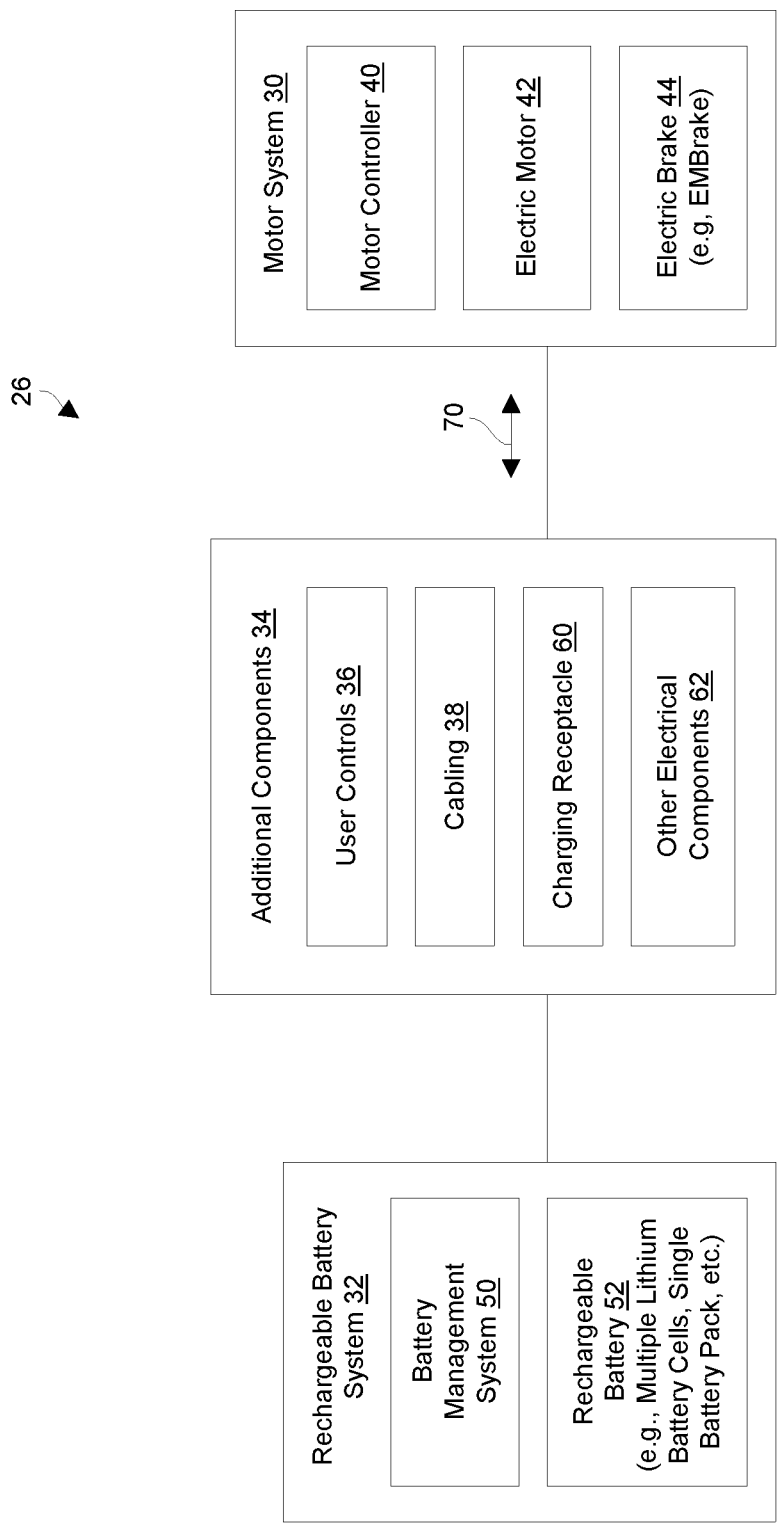
FIG. 2 is a block diagram of particular systems and components of the utility vehicle of FIG. 1 in accordance with certain embodiments.
Figure 3:
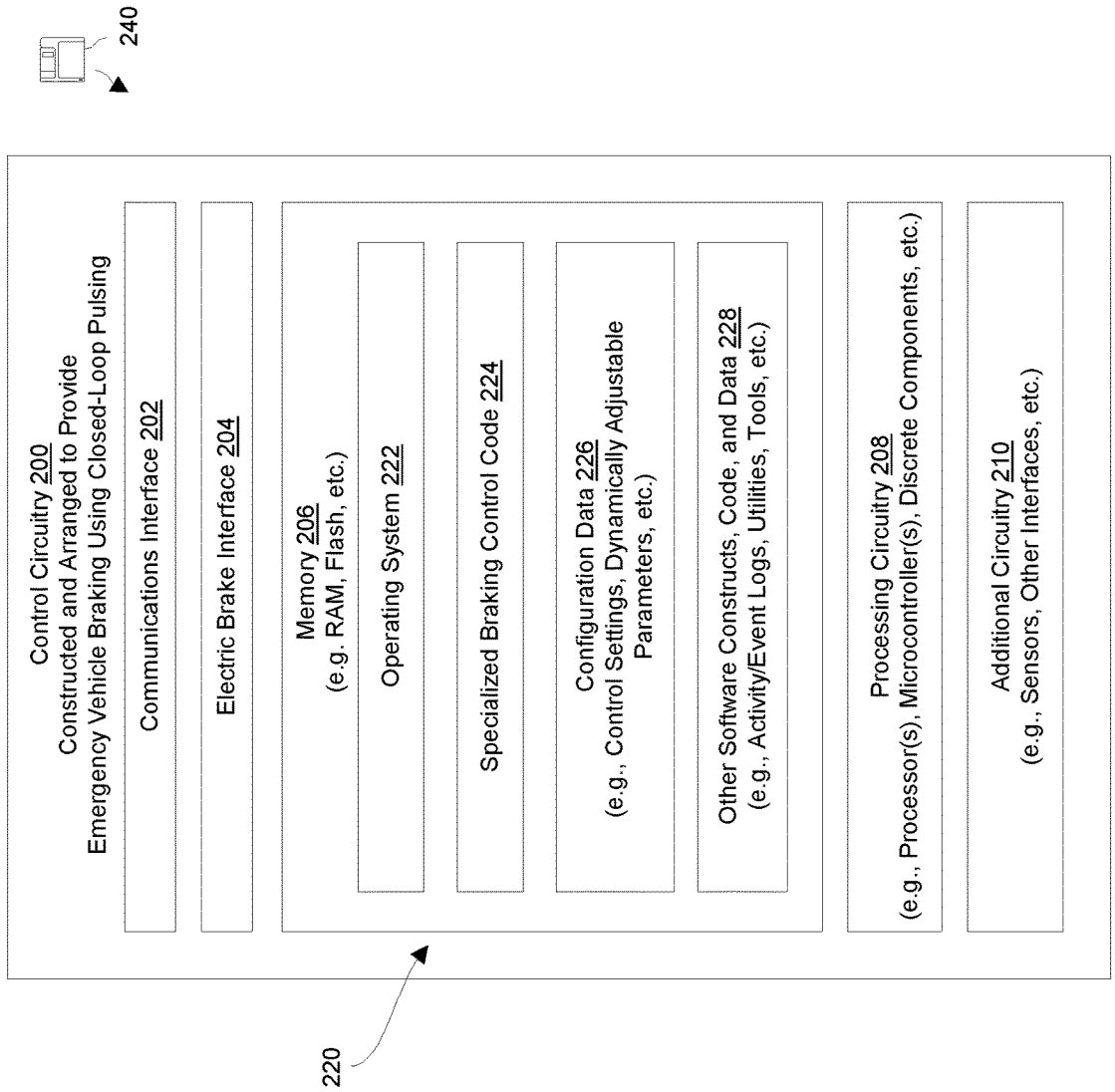
FIG. 3 is a block diagram of particular details of control circuitry of the utility vehicle of FIG. 1 in accordance with certain embodiments.

FIGS. 2 and 3 show particular details of the motion control system 26 of the utility vehicle 20 (FIG. 1) in accordance with certain example embodiments. FIG. 2 shows certain general components of the motion control system 26 of some embodiments and how these components are related. FIG. 3 shows particular lower level details of control circuitry which is suitable for at least a portion of the motion control system 26 in accordance with some embodiments.

As shown in FIG. 2, the motor system 30 of the motion control system 26 includes a motor controller 40, an electric motor 42 which is linked to the set of tires 24 (FIG. 1), and an electric brake 44 coupled with the electric motor 42. The motor controller 40 controls delivery of stored electric power from the rechargeable battery system 32 to the electric motor 42 which ultimately turns at least some of the tires 24 to move the utility vehicle 20. In some embodiments, the motor controller 40 further controls delivery of regenerative power from the electric motor 42 back to the rechargeable battery system 32 (e.g., regenerative braking for battery recharging).

The electric brake 44 is constructed and arranged to provide mechanical resistance which inhibits turning of the electric motor 42 when the electric brake 44 is unpowered. The electric brake 44 is further constructed and arranged to remove the mechanical resistance thus releasing the electric motor 42 and allowing the electric motor 42 to turn when the electric brake 44 receives power.

In some embodiments, the electric brake 44 is spring biased into an engaged state that provides braking resistance to the vehicle. When power is supplied to the electric brake 44, the electric brake 44 transitions from the engaged state to a released state that removes the braking resistance. Such operation may be made via a set of electromagnets, spring-biased actuators, etc. that control positioning of friction material.

In a particular embodiment, the electric brake 44 is an electromagnetically-released, spring-applied mechanical brake (or EMBrake). When power is provided to a set of electromagnets of the EMBrake, the set of electromagnets urges the EMBrake from the engaged state to the released state. When power is not provided to the set of electromagnets, a set of springs forces the EMBrake from the released state back to the engaged state. Accordingly, when the utility vehicle 20 is turned off or otherwise idle (e.g., sleeping), the electric brake 44 does not consume power but instead remains engaged to hold the utility vehicle 20 in a parked state.

As further shown in FIG. 2 and in accordance with certain embodiments, the rechargeable battery system 32 includes a battery management system (BMS) 50 and a rechargeable battery 52. The BMS 50 controls electrical access to the lithium battery 52. Additionally, the BMS 50 responds to certain events such as wakeup events (e.g., actuation of the user controls 36), charging situations, fault conditions, and so on to properly and safely control charging and discharging of the lithium battery 52.

It should be understood that a variety of battery types and form factors are suitable for the rechargeable battery 52. For example, the rechargeable battery 52 may be a lithium battery which includes multiple lithium battery cells, a single battery pack, combinations thereof, and so on. As another example, the rechargeable battery 52 may utilize one or more lead acid batteries in place of, or in combination with, the lithium battery, and so on.

The additional components 34 may, for example, include the set of user controls 36 (e.g., pedals, switches, etc.), the cabling 38, a charging receptacle 60, and perhaps other electrical components (or loads) 62 (e.g., lights, a global positioning system (GPS), specialized equipment, etc.). In some arrangements, the cabling 38 includes a communications bus, such as, for example, a controller area network (CAN) bus through which the motor system 30 and the rechargeable battery system 32 exchange communications 70 such as electronic CAN messages in accordance with the CAN protocol.

In accordance with certain embodiments, the motion control system 26 is equipped with certain sleep functionality to prevent parasitic loads from over-discharging the rechargeable battery 52. In particular, after the utility vehicle 20 sits idle for a predefined amount of time, such sleep functionality opens a main contactor leading to the rechargeable battery 52 (e.g., a lithium battery) in order to disconnect the rechargeable battery 52 from the parasitic loads. The main contactor then closes in response to a wakeup event (e.g., key actuation, a pedal press, etc.) to reconnect the rechargeable battery 52 and return power to the utility vehicle 20. A utility vehicle having similar sleep functionality is described in U.S. Pat. No. 10,195,953 having a filing date of Jan. 30, 2017, and having "CHARGING A LITHIUM BATTERY ON A UTILITY VEHICLE" as a title, the contents and teachings of which are herein incorporated by reference in their entirety.

It should be further understood that, in some embodiments, other conductive pathways exist between the rechargeable battery 52 and the motor system 30 that do not extend through the contactor. Moreover, in some embodiments, such as lead acid battery powered vehicles, the motor system 30 may connect directly to a set of lead acid batteries (e.g., where there is no over-discharge protection by a contactor).

FIG. 3 shows particular details of control circuitry 200 which is suitable for providing emergency vehicle braking using closed-loop pulsing in accordance with certain embodiments. The control circuitry 200 includes a communications interface 202, an electric brake interface 204, memory 206, processing circuitry 208, and additional circuitry 210.

In accordance with certain embodiments, the control circuitry 200 may form at least a portion of the motor system 30 (also see FIG. 2), e.g., a portion of the motor controller 40, circuitry separate from the motor controller 40, etc. Additionally or alternatively, the control circuitry 200 may form at least a portion of the rechargeable battery system 32 (FIG. 2), e.g., a portion of the BMS 50, circuitry separate from the BMS, etc.

The communications interface 202 is constructed and arranged to connect the control circuitry 200 to various portions of the utility vehicle 20. Examples of such portions include the electric motor 42 (e.g., to sense vehicle movement, speed, direction, etc.), the user controls 36, other motor system circuitry, circuits that are outside of the motion control system 26, and so on.

The electric brake interface 204 is constructed and arranged to connect the control circuitry 200 to the electric brake 44 (FIG. 2). For example, the electric brake interface 204 may include a switching circuit that closes to provide power from the rechargeable battery 52 to the electric brake 44 and opens to cut power from the rechargeable battery 52 to the electric brake 44. Such a switching circuit may be controlled by a control signal generated by the control circuitry 200. Accordingly, the control circuitry 200 may control power delivery from the rechargeable battery 52 to the electric brake 44 and thus transition the electric brake 44 between an engaged state in which the electric brake 44 is engaged and a released state in which the electric brake 44 is disengaged.

The memory 206 stores a variety of memory constructs 220 including an operating system 222, specialized braking control code 224, configuration data 226 (e.g., control settings, dynamically adjustable parameters, etc.), and other software constructs, code and data 228 (e.g., activity/event logs, utilities, tools, etc.). Although the memory 206 is illustrated as a single block in FIG. 4, the memory 206 is intended to represent both volatile and non-volatile storage (e.g., random access memory, flash memory, magnetic memory, etc.), and may, in some embodiments, include a plurality of discrete physical memory units.

The processing circuitry 208 is configured to run in accordance with instructions of the various memory constructs 220 stored in the memory 206. In particular, the processing circuitry 208 runs the operating system 222 to manage various computerized resources (e.g., processor cycles, memory allocation, etc.). Additionally, the processing circuitry 208 runs the specialized braking control code 224 to electronically control power to the electric brake 44. The processing circuitry 208 may be implemented in a variety of ways including via one or more processors (or cores) running specialized software, application specific ICs (ASICs), field programmable gate arrays (FPGAs) and associated programs, microcontrollers, discrete components, analog circuits, other hardware circuitry, combinations thereof, and so on. In the context of one or more processors executing software, a computer program product 240 is capable of delivering all or portions of the software to the control circuitry 200 (e.g., also see the memory constructs 220 in FIG. 4). The computer program product 240 has a non transitory (or non volatile) computer readable medium which stores a set of instructions which controls one or more operations of the control circuitry 200. Examples of suitable computer readable storage media include tangible articles of manufacture and other apparatus which store instructions in a non volatile manner such as flash memory, a magnetic storage medium (e.g., various disk memories such as a hard drive, floppy disk, or other magnetic storage medium), tape memory, optical disk (e.g., CD ROM, DVD, Blu-Ray, or the like), and the like. It will be appreciated that various combinations of such computer readable storage media may be used to provide the computer readable medium of the computer program product 240 in some embodiments.

The additional circuitry 210 represents other circuitry of the control circuitry 200. Such circuitry may include sensors, other interfaces, connectors, input and/or output devices (e.g., an alarm that sounds when the control circuitry 200 detects/responds to an emergency situation), and so on. Further details will now be provided with reference to FIG. 4.

Figure 4:
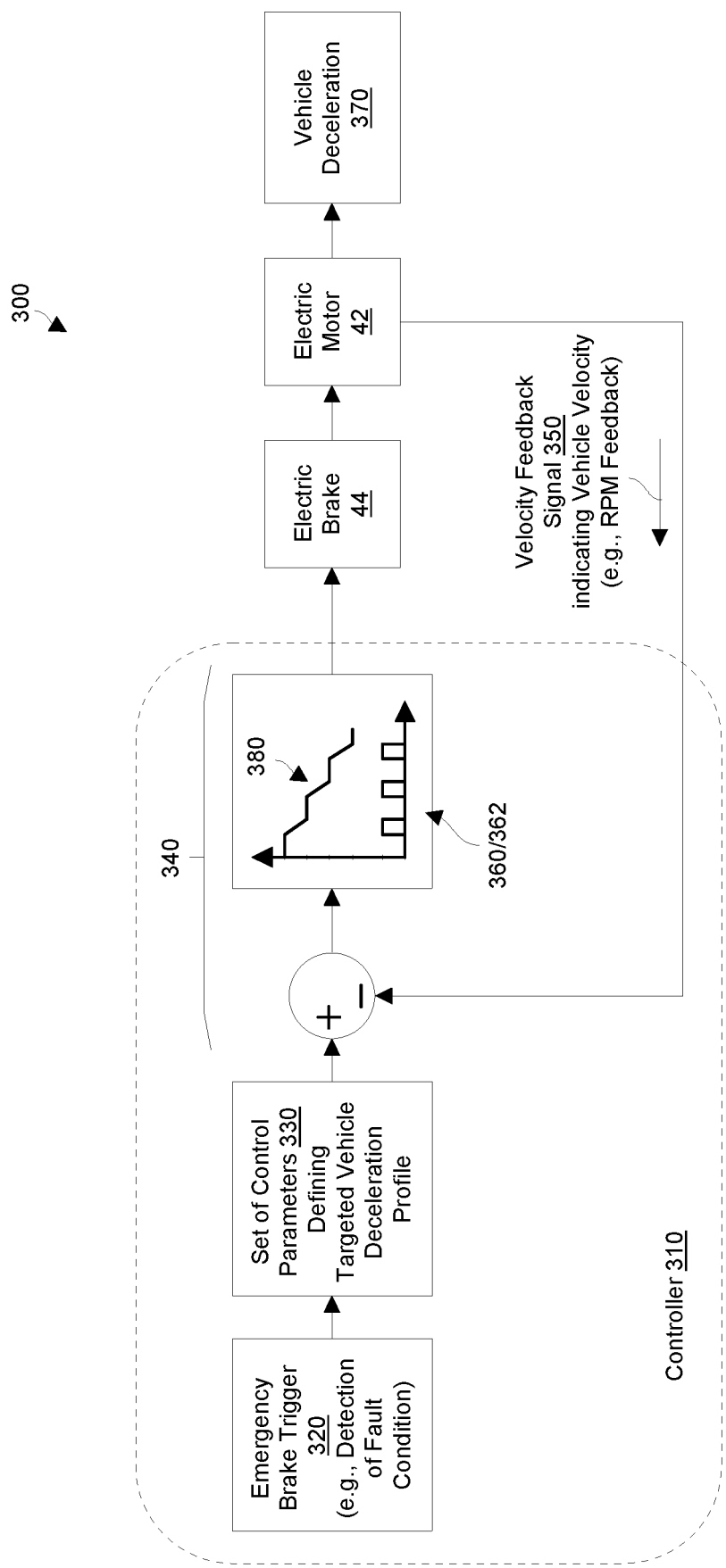
FIG. 4 is a general diagram illustrating closed-loop feedback for the example utility vehicle of FIG. 1 in accordance with certain embodiments.

FIG. 4 is a diagram 300 showing particular closed-loop feedback details for the utility vehicle 20 in accordance with certain embodiments. The diagram 300 shows a controller 310 (e.g., also see the control circuitry 200 in FIG. 3) constructed and arranged to control the electric brake 44 of the utility vehicle 20 by providing electric pulses having varying pulse timing, e.g., controlled by dynamically generated step signals, based on a velocity feedback signal.

As shown, the controller 310 electrically couples with the electric brake 44 which provides mechanical resistance that inhibits turning of the electric motor 42 when the electric brake 44 is unpowered. Additionally, the controller 310 has access to the current velocity of the utility vehicle 20. To this end, the controller 310 may form at least part of the motor system 30 and/or the rechargeable battery system 32 (also see FIG. 2).

In some arrangements, the controller 310 electrically couples with the electric motor 42, and current motor RPM (rotations per minute) is directly correlated to current vehicle velocity according to the gear ratio that links the electric motor 42 to the set of tires 24. Accordingly, current motor RPM may be considered an indicator of the current speed of the utility vehicle 20. Other vehicle velocity sensing mechanisms are suitable for use as well such as a set of wheel speed sensors, a set of ground speed sensors, combinations thereof, and so on.

During operation, the controller 310 may perform pulse-based emergency braking in response to an emergency brake trigger (or event) 320. For example, the controller 310 may determine that the utility vehicle 20 is exceeding a maximum predefined speed and consider that situation to be a fault condition requiring the utility vehicle 20 to reduce its speed or even stop. Other situations are suitable for use as an emergency brake trigger 320 as well such as detecting loss of regenerative braking, determining that the difference between the current vehicle speed and the expected vehicle speed (e.g., based on the current pedal deflection angle) exceeds a predefined threshold, and so on.

In response to the emergency brake trigger 320, the controller 310 accesses a set of control parameters 330 that defines a targeted deceleration profile for the utility vehicle 20 (e.g., also see the configuration data 226 in FIG. 3). The targeted deceleration profile may include a different vehicle deceleration rate for different vehicle velocities or for different velocity ranges (or for different electric motor RPMs or for different electric motor RPM ranges).

Next, the controller 310 performs electric pulse generation 340 based on the set of control parameters 330 and a velocity feedback signal 350 that identifies the current speed of the utility vehicle 20. As shown in FIG. 4 and in accordance with certain embodiments, the velocity feedback signal 350 may be provided by the electric motor 42 and thus indicate the current speed of the utility vehicle 20 in terms of motor RPM.

During electric pulse generation 340, the controller 310 provides a control signal in the form of a series 360 of dynamically generated braking pulses 362 which controls delivery of power from the rechargeable battery 52 (FIG. 2) to the electric brake 44. For example, the control signal may open and close switching circuitry between the rechargeable battery 52 and the electric brake 44. Accordingly, the braking pulses 362 of the series 360 are formed in real time and may differ from one another.

In particular, each dynamically generated braking pulse 362 includes an "ON" time to engage braking in which power is cut from the rechargeable battery 52 to the electric brake 44, and an "OFF" time to disengage braking in which power is provided from the rechargeable battery 52 to the electric brake 44. In response to the "ON" time of that pulse 362 (i.e., electric braking "ON"), the electric brake 44 briefly engages to apply braking to the electric motor 42 resulting in vehicle deceleration 370 due to linkage between the electric motor 42 and the set of tires 24. In response to the "OFF" time of that pulse 362 (i.e., electric braking "OFF"), the electric brake 44 releases thus removing braking from the electric motor 42.

It should be appreciated that during electric pulse generation 340, the velocity feedback signal 350 will indicate the drop in vehicle velocity. Accordingly, the controller 310 is able to adjust the braking pulses 362 in real time so that the control signal provides effective vehicle deceleration 370 having an effective deceleration profile 380 that closely mirrors the targeted deceleration profile.

In some arrangements, the controller 310 is constructed and arranged to continue electric pulse generation 340 for a set period of time after the emergency brake trigger 320 (e.g., eight seconds). After the set period of time has elapsed, the controller 310 discontinues the electric pulses to the electric brake 44 to continuously engage the electric brake.

Additionally, in some arrangements, the controller 310 activates an audio alarm in response to the emergency brake trigger 320. The audio alarm provides an alert indicating imminent deceleration of the utility vehicle 20. Further details will now be provided with reference to FIGS. 5 through 7.

Figure 5:
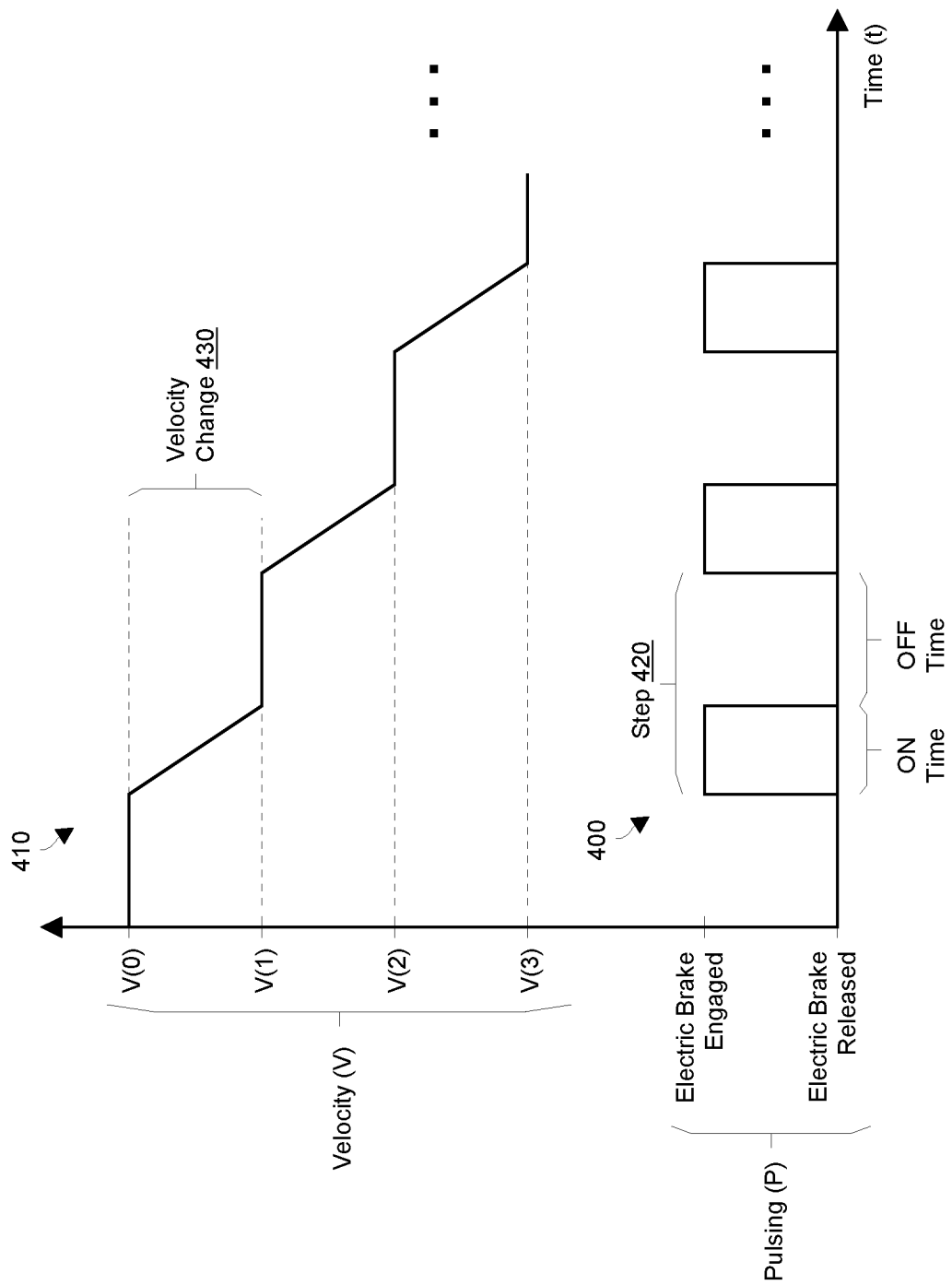
FIG. 5 is a general chart illustrating emergency vehicle braking performance in accordance with certain embodiments.
Figure 6:
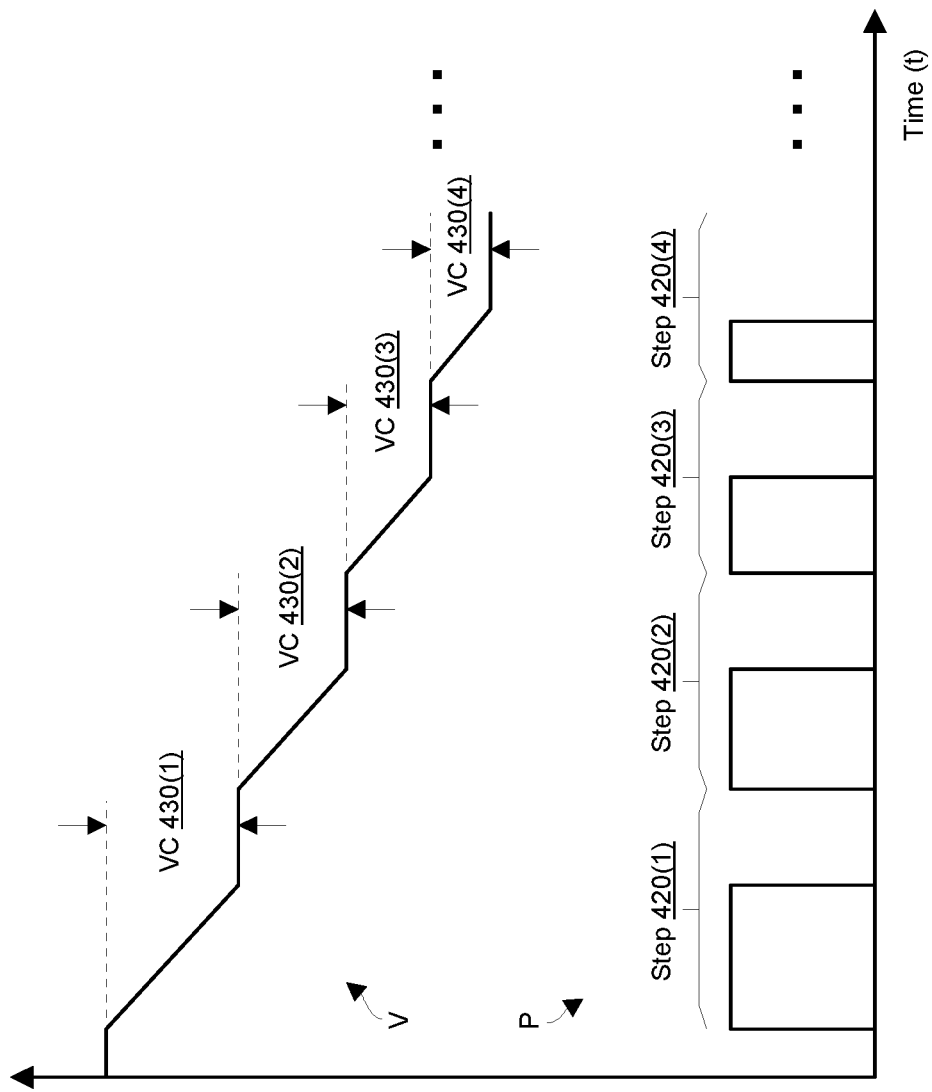
FIG. 6 is an example chart illustrating emergency vehicle braking performance with dynamically generated "ON" times to engage braking in accordance with certain embodiments.
Figure 7:
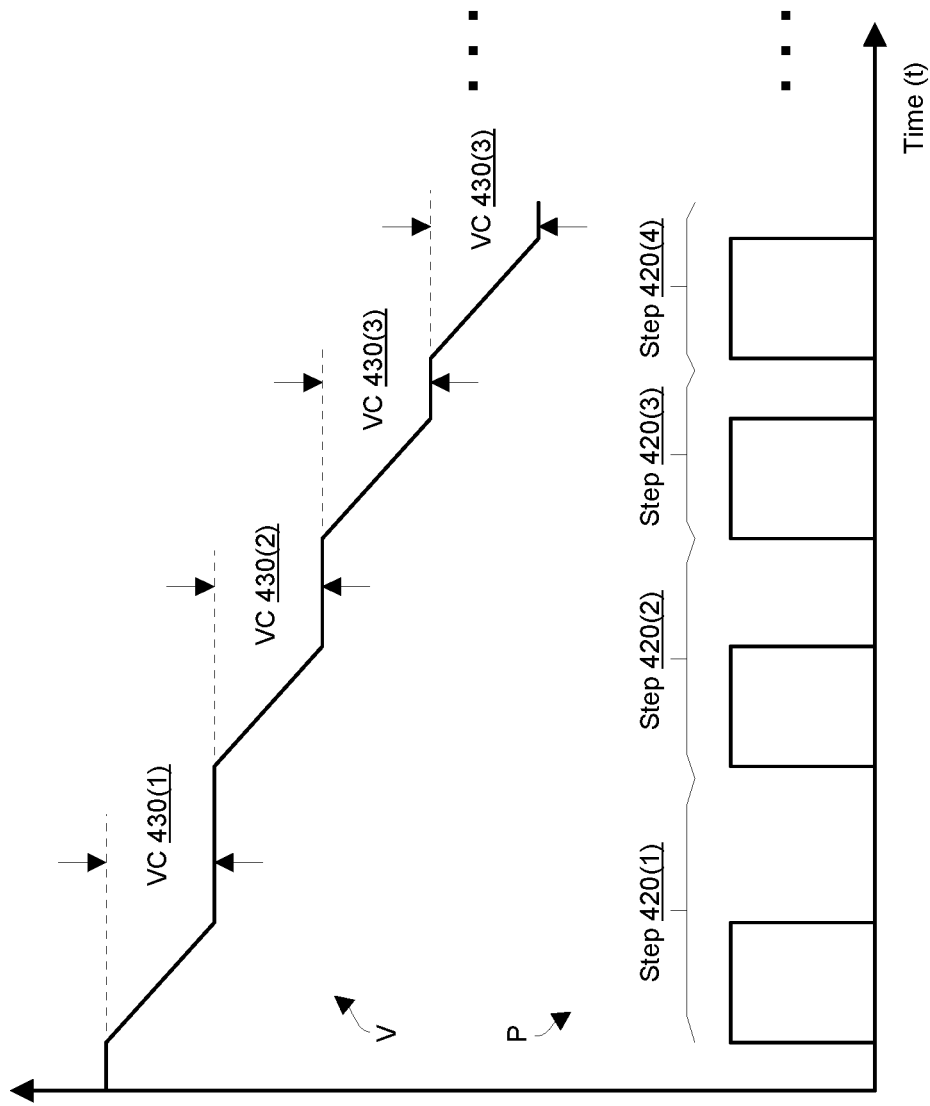
FIG. 7 is an example chart illustrating emergency vehicle braking performance with dynamically generated "OFF" times to disengage braking in accordance with certain embodiments.

FIGS. 5 through 7 illustrate particular emergency vehicle braking details in accordance with certain example embodiments. FIG. 5 shows a plot (P) for a series of braking pulses for use as a control signal to control the electric brake 44 and a plot (V) for the velocity of the utility vehicle 20 over time (t). FIG. 6 shows the plot (P) and the plot (V) when the utility vehicle 20 varies the braking "ON" time of the braking pulses. FIG. 7 shows the plot (P) and the plot (V) when the utility vehicle 20 varies the braking "OFF" time of the braking pulses.

With reference to FIG. 5, it should be appreciated that the plot (P) for the series of braking pulses includes step signals (or simply steps) 420 in which, for each step 420, power is cut for a braking "ON" time and then provided for a braking "OFF" time. During the braking "ON" time portion of each step 420, there is a corresponding drop in vehicle velocity (V) and electric motor RPM due to engagement of the electric brake 44.

Along these lines and as noted in FIG. 5, there is a velocity change 430 from V(0) to V(1) in response to the braking "ON" time of the first step 420. Likewise, there is another velocity change 430 from V(1) to V(2) in response to the braking "ON" time of another step 420, and so on. During these steps 420, the current vehicle velocity (V) (or current motor RPM) dictates the particular character of the next step 420 (e.g., braking "ON" time duration, braking "OFF" time duration, both, etc.).

With reference now to FIG. 6 and in accordance with certain embodiments, the controller 310 dynamically adjusts the braking "ON" time duration in each step 420. However, the controller 310 holds the braking "OFF" time duration constant in each step 420.

Accordingly, for the first step 420(1), the controller 310 maintains braking (i.e., braking "ON" time) from the electric brake 44 until the controller 310 senses a target drop in current vehicle velocity (e.g., a specified drop in motor RPM). At that point, the controller 310 provides power back to the electric brake 44 for a predefined amount of time (i.e., braking "OFF" time).

Next, for the second step 420(2), the controller 310 maintains braking (i.e., braking "ON" time) from the electric brake 44 until the controller 310 senses another target drop in current vehicle velocity (e.g., a specified drop in motor RPM). At that point, the controller 310 provides power back to the electric brake 44 for the predefined amount of time (i.e., braking "OFF" time), and so on.

The utility vehicle 20 may be configured to continue this operation until the utility vehicle 20 comes to a full stop or until the vehicle velocity drops to a predefined safe speed (i.e., a predefined threshold). In some arrangements, once the vehicle velocity drops below a predefined particular speed (e.g., when the electric motor 42 rotates at 275 RPMs or lower), the controller 310 then cuts power to the electric brake 44 continuously so that the utility vehicle 20 comes to a full stop.

As mentioned earlier, the targeted deceleration profile may include a different vehicle deceleration rate for different vehicle speed ranges (or different electric motor RPM ranges). For example, the set of control parameters 330 may impose a first deceleration rate of 800 RPMs for each braking pulse when the electric motor 42 rotates between 5000 and 1000 RPMs, a second deceleration rate of 250 RPMs for each braking pulse when the electric motor 42 rotates between 1000 and 275 RPMs, and maximum deceleration (e.g., continuous braking) when the electric motor 42 rotates at less than 275 RPMs.

With reference now to FIG. 7 and in accordance with certain embodiments, the controller 310 dynamically adjusts the braking "OFF" time duration in each step 420. However, the controller 310 holds the braking "ON" time duration constant in each step 420.

Accordingly, for the first step 420(1), the controller 310 maintains braking (i.e., braking "ON" time) to the electric brake 44 for a predefined amount of time regardless of the drop in current vehicle velocity. At that point, the controller 310 provides power back to the electric brake 44 for an amount of time (i.e., braking "OFF" time) based on the current vehicle velocity.

Next, for the second step 420(2), the controller 310 maintains braking (i.e., braking "ON" time) to the electric brake 44 for the same predefined amount of time regardless of the drop in current vehicle velocity. At that point, the controller 310 provides power back to the electric brake 44 for an amount of time (i.e., braking "OFF" time) based on the current vehicle velocity, and so on.

Again, the utility vehicle 20 may be configured to continue this operation until the utility vehicle 20 comes to a full stop or until the vehicle velocity drops to a predefined safe speed. In some arrangements, once the vehicle velocity drops below a predefined speed (e.g., when the electric motor 42 rotates at 275 RPMs or lower), the controller 310 then cuts power to the electric brake 44 continuously so that the utility vehicle 20 comes to a full stop.

By way of example only, the controller 310 may hold the braking "ON" time for each step at a predefined amount of time such as 0.2 seconds. Furthermore, the controller 310 may set the braking "OFF" time as 0.4 seconds when the RPM of electric motor 42 is between 5000 and 2000 RPM, and as 0.2 seconds when the RPM of electric motor 42 is between 2000 and 500 RPM, and so on. Other ranges and times are suitable for use as well.

Moreover, it should be appreciated that the controller 310 may be constructed and arranged to adjust both the braking "ON" time duration and the braking "OFF" time duration for each step of the series 360 of pulses 362. In such a situation, when the current vehicle velocity is within a first velocity range, the controller 310 provides a step having a first braking "ON" time duration and a first braking "OFF" time duration. Then, when the current vehicle velocity is within a second velocity range, the controller 310 provides a step having a second braking "ON" time duration and a second braking "OFF" time duration that are different from the first braking "ON" time duration and the first braking "OFF" time duration, and so on. Further details will now be provided with reference to FIG. 8.

Figure 8:
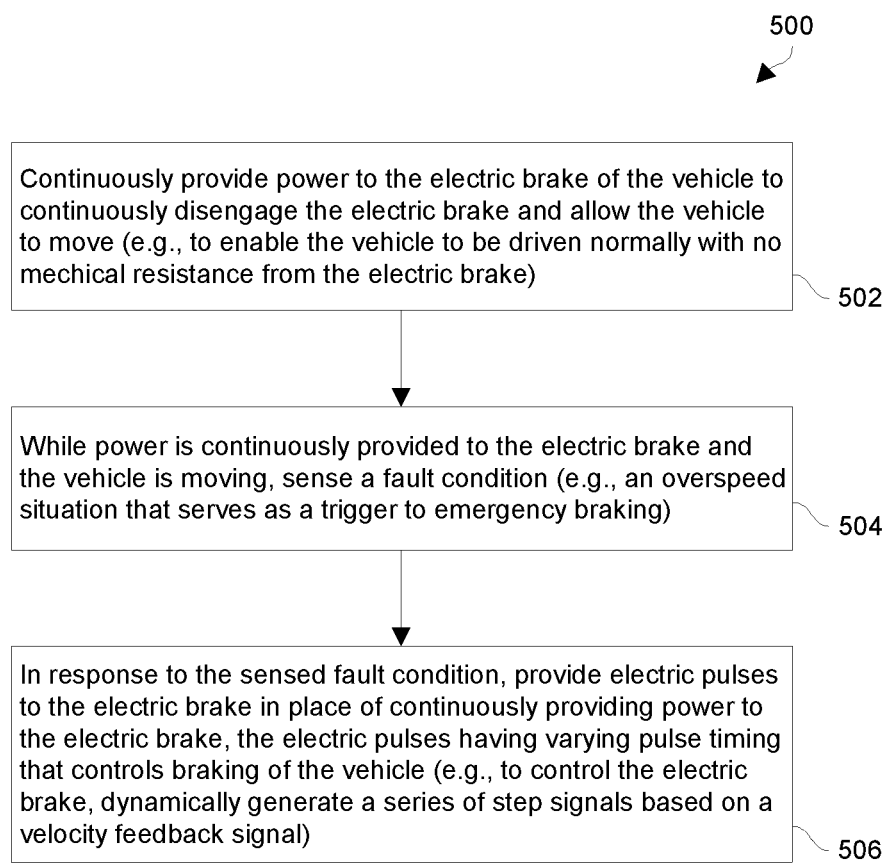
FIG. 8 is a flowchart of a procedure which is performed by a vehicle in accordance with certain embodiments.

FIG. 8 is a flowchart of a procedure 500 which is performed by specialized circuitry of a vehicle in accordance with certain embodiments. In particular, the specialized circuitry provides electric pulses having varying pulse timing, e.g., dynamically generated step signals, based on a velocity feedback signal to prevent the vehicle from stopping too abruptly.

At 502, the specialized circuitry continuously provides power to the electric brake of the vehicle to continuously disengage the electric brake and allow the vehicle to move. Accordingly, an operator is able to drive the vehicle normally without there being any mechanical resistance provided by the electric brake.

At 504, while power is continuously provided to the electric brake and the vehicle is moving, the specialized circuitry senses a fault condition. For example, the specialized circuitry may detect occurrence of an overspeed situation which serves as a trigger to emergency braking).

At 506, in response to sensing the fault condition, the specialized circuitry provides electric pulses to the electric brake in place of continuously providing power to the electric brake. Such electric pulses have varying pulse timing that controls braking of the vehicle. For example, to control braking, the specialized circuitry may control a power delivery switch using a control signal that is a dynamically generated series of step signals based on a velocity feedback signal that indicates current velocity of the vehicle.

As described above, improved techniques are directed to controlling an electric brake 44 of a vehicle 20 by providing a series of electric pulses having varying pulse timing, e.g., dynamically generating step signals 420 to control the electric brake 44, based on a velocity feedback signal 350. Such techniques provide closed-loop control of "ON" and/or "OFF" pulse timing to counter any variation in electric brake response.

Accordingly, each vehicle 20 may be configured to provide a more consistent braking response regardless of variations from brake 44 to brake 44, the current weight carried by the vehicle 20, environmental conditions, and so on.

While various embodiments of the present disclosure have been particularly shown and described, it will be understood by those skilled in the art that various changes in form and details may be made therein without departing from the spirit and scope of the present disclosure as defined by the appended claims.

As mentioned herein and in accordance with certain embodiments, a vehicle is provided with emergency vehicle braking by closed-loop pulsing of an electromagnetically-released, spring-applied brake. Such an electric brake may also be referred to as an EMBrake, an Intellibrake, as well as other names that reference electric braking mechanisms responsive to power signals.

It should be understood that electric vehicles with service braking based purely on regenerative braking via the vehicle traction drive system may further employ an emergency braking system based on an electric brake. Such a mechanism may be used to bring the vehicle to a stop in the event of any condition where vehicle travel may no longer be adequately controlled. The most common method for employing the electric brake is to cut power to the electric brake and allow the springs within the electric brake to engage friction material that brings the vehicle to an abrupted stop. In conventional vehicles, this has the disadvantage of subjecting vehicle occupants to a very abrupt and harsh deceleration.

Another approach used to employ an electric brake may involve "pulsing" the electric brake by cutting power intermittently. This allows for a less sudden or abrupt emergency braking. The braking performance using this approach, however, is very depended on the particularities of that electric brake. Any variation in the electric brake (from brake to brake or over time) that affects how quickly or slowly the electric brake engages/disengages as well as how much frictional force is applied will cause variation in the vehicle deceleration. This is very problematic when establishing the "ON" and "OFF" timing of the electric brake pulsing. On one end of the spectrum, the "ON" and "OFF" timing could result in some vehicles not experiencing any deceleration at all. On the other end of the spectrum, the "ON" and "OFF" timing could result very high vehicle deceleration in some vehicles, similar to where power to the electric brake is completely "cut".

However, certain improvements disclosed herein solve the problem of electric brake variation and its effect on pulse braking by employing vehicle velocity feedback. This enables closed-loop control of the "ON" and "OFF" pulse timing of the electric brake. By using vehicle velocity feedback, the pulse timing can be dynamically varied during pulsing to counter any variation in the electric brake response. Additionally, by employing closed-loop control of the pulsing, much more tailored vehicle deceleration rates and profiles can be achieved.

As mentioned earlier in connection with FIG. 4, a closed-loop feedback method for pulsing an electric brake is able to achieve a targeted deceleration rate. Such a method may utilize the existing motor speed controller and motor RPM feedback to employ a closed-loop control of pulsing the electric brake to bring the vehicle to a stop under certain conditions. In accordance with certain embodiments, the motor speed controller determines when the conditions are met for bringing the vehicle to a stop, e.g., overspeed conditions, loss of primary service braking, etc. At this point, the motor speed controller electrically releases power that was applied to the electric brake which in turn allows the internal springs in the electric brake to engage the friction material and begin slowing the vehicle. Programmed within the motor speed controller is a target for a decrease in motor RPM. Once this target drop in RPM is achieved, the motor speed controller then reapplies power to the electric brake. By reapplying power to the electric brake, the springs are compressed by an electromagnet which disengages the fiction material. At this point, the controller keeps the electric brake powered for an amount of time before it again, cuts power to the electric brake to initiate another drop in motor RPM as the brake friction material is reengaged. This "pulsing" on and off will continue as the motor RPM is stepped down which, in turn, brings the vehicle speed down at a very controlled rate (e.g., also see FIG. 5).

In accordance with certain embodiments and with reference back to FIG. 5, control of an electrically disengaged, spring engaged brake is able to reduce vehicle speed at a specific rate by pulsing the brake on and off. The amount of time that the brake is engaged is based on feedback from a vehicle speed (RPM) sensor. The brake remains engaged until the target decrease in speed (RPM) is reached. At this point, the brake is disengaged for a constant period followed by another brake engagement and so on. By pulsing the brake (engage, disengage, etc) in this fashion, the vehicle speed can be brought down in "steps" to achieve a very controlled vehicle deceleration.

In accordance with certain embodiments, it should be understood that the targeted RPM drop per pulse may be changed from pulse to pulse. Specifically, from the first pulse to the second pulse, the targeted RPM drop could decrease. Subsequently, the targeted RPM drop could continue to decrease with each following pulse. By employing this method of decreasing the RPM target drop for each subsequent pulse, a different vehicle deceleration profile can be achieved (e.g., also see FIG. 6).

In accordance with certain embodiments and with reference back to FIG. 6, an engaging/disengaging of the electric brake where the target drop in RPM that determines engagement duration decreases with each subsequent pulse. This decrease in the target drop in RPM from pulse to pulse allows for the average decrease in vehicle speed to be altered over time.

Another illustration of this could be shown by having the target drop increase with each additional pulse. Along these lines, the brake disengagement time is constant from pulse to pulse.

In accordance with certain embodiments, the "OFF" time of the pulsing (the time during which the electric brake is energized by the controller such that the friction material is not engaged) is adjusted dynamically. Just like the method where the "ON" time varies with each pulse, the "OFF" time is varied with each pulse (also see FIG. 7).

In accordance with certain embodiments and with reference back to FIG. 7, an engaging/disengaging of the electric brake where the target drop in RPM that determines engagement duration remains constant with each subsequent electric brake pulse. The brake disengagement or "OFF" time, however, decreases with each subsequent pulse. This decrease in "OFF" time further enables a change in the average decrease in vehicle speed over time.

One should appreciate that electric vehicles that employ an electromagnetically released, spring applied brake typically use such brakes as a park brake only. In other applications, such brakes are also used for emergency braking. When used as an emergency brake, the most common conventional approach may be to cut power completely to the electric brake to allow the engagement of the friction material within the electric brake to bring the vehicle to a very rapid stop. Another conventional approach to using an electric brake for emergency braking attempts to lesson the rate of deceleration of the vehicle by pulsing the electric brake "ON" and "OFF". This "ON" and "OFF" pulsing, however, is purely time-based. There is no feedback employed in this conventional approach which has the disadvantage of being very subject to variation within the electric brake itself.

The earlier-described utility vehicle included a rechargeable battery such as one with lithium ion battery packs or lead acid battery packs. However, any utility vehicle platform can employ an electric brake for emergency braking. If a control system with vehicle velocity or drivetrain rotational feedback is also employed on the platform, the improved techniques disclosed herein may be easily implemented. Moreover, such techniques may be applied to any powertrain and vehicles of any fuel type, e.g., gas, diesel, biodiesel, ethanol, electric, and so on.

One should further appreciate that certain improved techniques are applicable to vehicles other than strictly land-based vehicles such as aircraft (e.g., during landing), watercraft (e.g., when on land), etc. Such modifications and enhancements are intended to belong to various embodiments of the disclosure.

What is claimed is:
1. A method of controlling an electric brake of a vehicle, the method comprising:
 continuously providing power to the electric brake of the vehicle to continuously disengage the electric brake and allow the vehicle to move;

while power is continuously provided to the electric brake and the vehicle is moving, sensing a fault condition; and in response to sensing the fault condition, providing electric pulses to the electric brake in place of continuously providing power to the electric brake, the electric pulses having varying pulse timing that controls braking of the vehicle;

wherein the electric brake includes (i) a set of springs that are configured to bias the electric brake into an engaged state that provides braking resistance to the vehicle, and (ii) a set of electromagnets configured to urge the electric brake from the engaged state to a released state that removes the braking resistance; and wherein continuously providing power to the electric brake includes:

outputting a steady power signal from a power source to the set of electromagnets to urge the electric brake from the engaged state to the released state.

2. A method as in claim 1, further comprising:

receiving a velocity feedback signal indicating current vehicle velocity, and wherein providing the electric pulses includes:

dynamically generating, as a control signal that controls the electric pulses, a series of step signals based on the velocity feedback signal.

3. A method as in claim 2 wherein dynamically generating the series of step signals based on the velocity feedback signal includes:

based on a first vehicle velocity indicated by the velocity feedback signal, outputting a first step signal having a first "ON" time for engaging the electric brake and a first "OFF" time for disengaging the electric brake, and based on a second vehicle velocity indicated by the velocity feedback signal, outputting a second step signal having a second "ON" time for engaging the electric brake and a second "OFF" time for disengaging the electric brake, at least one of (i) the first "ON" time being different from the second "ON" time, or (ii) the first "OFF" time being different from the second "OFF" time.

4. A method as in claim 3 wherein the first vehicle velocity is faster than the second vehicle velocity; and wherein the first "ON" time is longer than the second "ON" time.

5. A method as in claim 3 wherein the first vehicle velocity is faster than the second vehicle velocity; and wherein the first "OFF" time is longer than the second "OFF" time.

6. A method as in claim 3 wherein the first "ON" time is different from the second "ON" time; and wherein the first "OFF" time is different from the second "OFF" time.

7. A method as in claim 3 wherein providing the electric pulses includes:

intermittently cutting power from the power source to the set of electromagnets to enable the electric brake to intermittently transition from the released state back to the engaged state.

8. A method as in claim 1 wherein sensing the fault condition includes:

comparing a set of current vehicle readings to a set of expected vehicle criteria, and detecting that at least one current vehicle reading of set of current vehicle readings is out of compliance with at least one expected vehicle criterion of the set of expected vehicle criteria.

9. A method as in claim 8 wherein detecting includes:

determining that a current rotations per minute (RPM) reading from an electric motor of the vehicle exceeds a predefined RPM threshold to indicate that the fault condition has occurred.

10. A method as in claim 1, further comprising:

in response to sensing the fault condition, starting a timer, and in response to the timer identifying that a predefined amount of time has elapsed since sensing the fault condition, discontinuing the electric pulses to the electric brake to continuously engage the electric brake.

11. A method as in claim 10, further comprising:

in response to sensing the fault condition, activating an audio alarm to indicate imminent deceleration of the vehicle.

12. An electric vehicle, comprising:

a vehicle body;

an electric brake supported by the vehicle body;

electronic circuitry coupled to the electric brake, the electronic circuitry being constructed and arranged to perform a method of:

continuously providing power to the electric brake to continuously disengage the electric brake and allow the electric vehicle to move, while power is continuously provided to the electric brake and the electric vehicle is moving, sensing a fault condition, and in response to sensing the fault condition, providing electric pulses to the electric brake in place of continuously providing power to the electric brake, the electric pulses having varying pulse timing that controls braking of the electric vehicle;

wherein the electric brake includes (i) a set of springs that are configured to bias the electric brake into an engaged state that provides braking resistance to the vehicle, and (ii) a set of electromagnets configured to urge the electric brake from the engaged state to a released state that removes the braking resistance; and wherein the electric vehicle further comprises:

a lithium battery supported by the vehicle body;

wherein continuously providing power to the electric brake includes:

outputting a steady power signal from the lithium battery to the set of electromagnets to urge the electric brake from the engaged state to the released state.

13. An electric vehicle as in claim 12 wherein providing the electric pulses includes:

intermittently cutting power from the lithium battery to the set of electromagnets to enable the electric brake to intermittently transition from the released state back to the engaged state.

14. Electronic circuitry to control an electric brake of a vehicle, comprising:

an electric brake interface;

a sensor interface; and control circuitry coupled to the electric brake interface and the sensor interface, the control circuitry being constructed and arranged to perform a method of:

continuously providing power to the electric brake of the vehicle through the electric brake interface to continuously disengage the electric brake and allow the vehicle to move, while power is continuously provided to the electric brake and the vehicle is moving, sensing a fault condition via the sensor interface, and in response to sensing the fault condition, providing electric pulses to the electric brake through the electric brake interface in place of continuously providing power to the electric brake, the electric pulses having varying pulse timing that controls braking of the vehicle;

wherein the electric brake includes (i) a set of springs that are configured to bias the electric brake into an engaged state that provides braking resistance to the vehicle, and (ii) a set of electromagnets configured to urge the electric brake from the engaged state to a released state that removes the braking resistance; and wherein continuously providing power to the electric brake includes:

outputting a steady power signal from a power source to the set of electromagnets to urge the electric brake from the engaged state to the released state.

15. The method as in claim 1, wherein the electric brake is constructed and arranged to engage when unpowered;

wherein providing electrical pulses to the electric brake includes:

alternating between (1) removing power to the electric brake to engage the electric brake and (2) providing power to the electric brake to disengage the electric brake.

16. The method as in claim 1, wherein continuously providing power to the electric brake includes:

powering the electric brake to transition the electric brake from the engaged state that provides braking resistance to the released state that removes the braking resistance; and while the electric brake is in the released state, continuing to power the electric brake to maintain the electric brake in the released state.

17. The method as in claim 16, wherein providing the electric pulses in place of continuously providing power includes:

while continuing to power the electric brake to maintain the electric brake in the released state, generating a control signal that instructs the power source of the electric vehicle to cut and restore power to the electric brake to transition the electric brake from the released state to the engaged state and back to the released state.

* * * * *